UNITED STATES PATENT OFFICE.

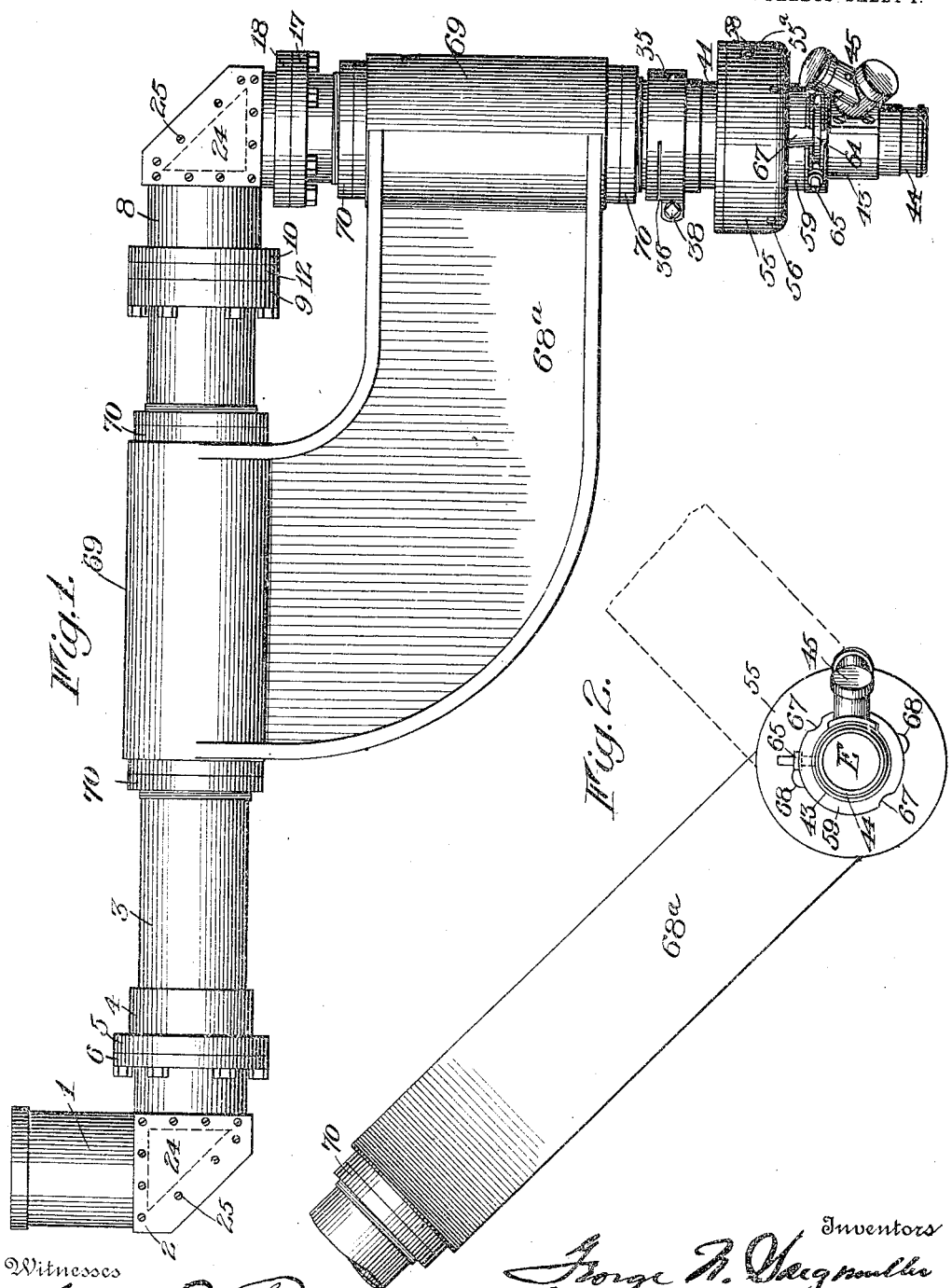

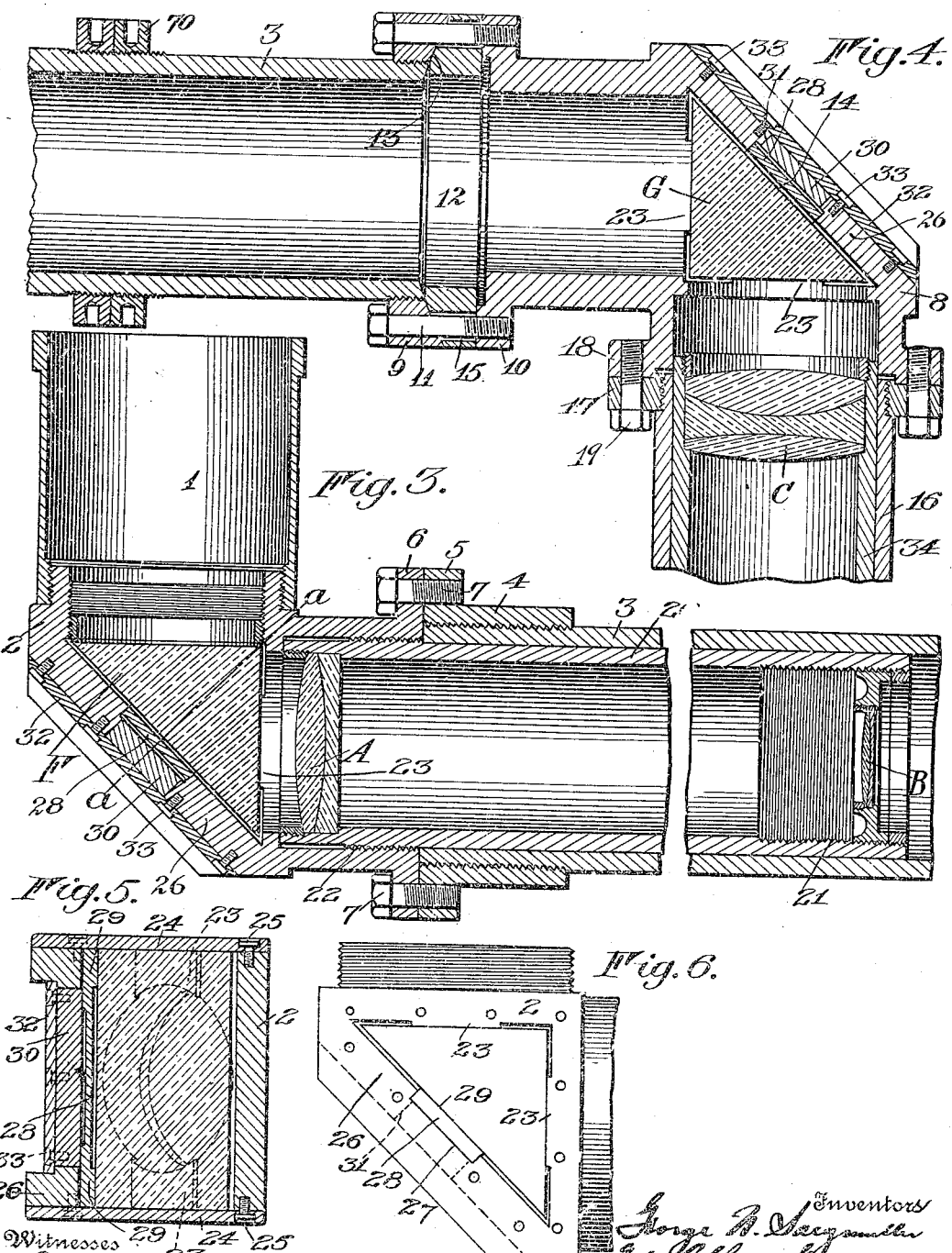

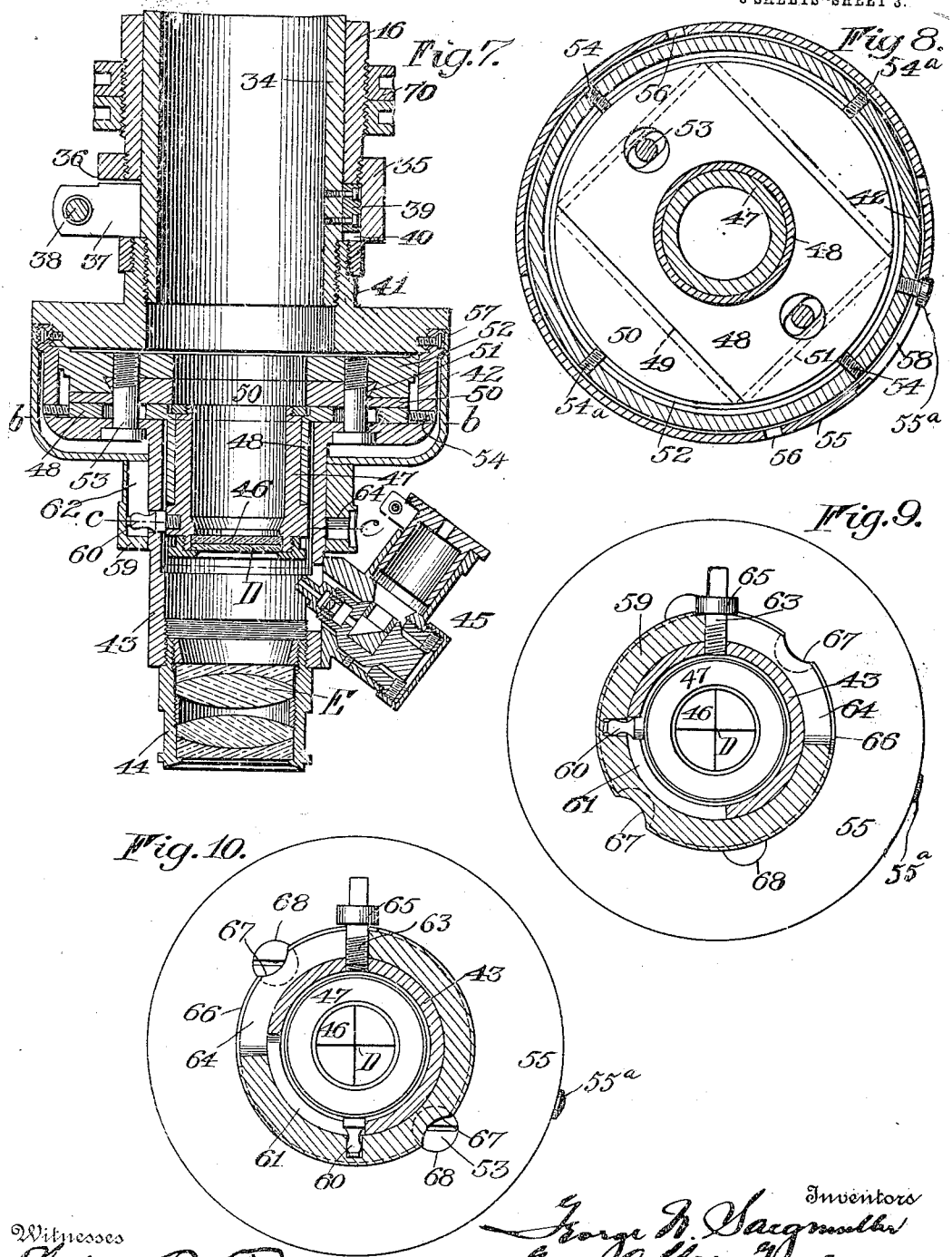

GEORGE N. SAEGMULLER AND ALBERT GREBE, OF ROCHESTER, NEW YORK, ASSIGNORS TO BAUSCH & LOMB OPTICAL COMPANY, OF ROCHESTER, NEW YORK, A CORPORATION OF NEW YORK.

SIGHTING-TELESCOPE.

1,011,248.     Specification of Letters Patent.     Patented Dec. 12, 1911.

Application filed March 3, 1910. Serial No. 547,146.

*To all whom it may concern:*

Be it known that we, GEORGE N. SAEGMULLER and ALBERT GREBE, both of Rochester, in the county of Monroe, State of New York, have invented certain new and useful Improvements in Sighting-Telescopes; and we do hereby declare the following to be a full, clear, and exact description of the same, reference being had to the accompanying drawings, forming a part of this specification, and to the reference-numerals marked thereon.

The present invention relates to sighting telescopes and it has for an object to provide a construction adapted for use with guns located within a restricted space, such for instance as in the turret of a war-ship.

A further object is to construct the parts so that they will not be displaced nor have their adjustments destroyed by the vibrations or jars due to the firing of the gun.

A still further object is to provide a construction in which the cross hairs or sighting mark may be rotated in order that the instrument may be shifted relatively to the gun.

To these and other ends the invention consists in certain improvements and combinations of parts all as will be hereinafter more fully described, the novel features being pointed out in the claims at the end of the specification.

In the drawings: Figure 1 shows an exterior view of an instrument constructed in accordance with this invention and having a supporting bracket connected thereto; Fig. 2 shows, in full lines and in dotted lines, two different positions to which the instrument is capable of being shifted; Fig. 3 is an axial section of the instrument in proximity to the objective end thereof; Fig. 4 is an axial section in proximity to the erecting system; Fig. 5 is a section on the line *a—a* of Fig. 3; Fig. 6 is a detail view of the manner of mounting the prisms, the one in proximity to the objective in the present instance being illustrated; Fig. 7 is an axial section of the telescope in proximity to the eye piece; Fig. 8 is a section on the line *b—b* of Fig. 7, and Figs. 9 and 10 are sections on the line *c—c* of Fig. 7, showing the cross hairs or sighting mark at its two limits of adjustment.

In the turret of a warship the space is so restricted that it is undesirable to use an ordinary telescope with a straight casing and it has been customary to employ one having a casing of angular formation so that the eyepiece may lie to one side of the gun as usual while the objective may be disposed at any convenient place. In such telescopes the cross hairs or sighting mark has been arranged with reference to the position of the instrument so that one cross may lie vertical while the other is horizontal. Therefore, when, as has been the case, it was desired to change the position of the usual instrument to the opposite side of the gun the cross hairs do not lie in the proper positions. In this invention provision has been made whereby the cross hairs or sighting mark may be shifted or rotated in its plane so that the casing of the instrument may be placed in any position. There has also been provided a construction in which the positions of the optical parts (lenses and reflectors) are held firmly in position against the vibrations produced in firing the gun, and the several adjustments have also been constructed so that they will not be affected by the vibrations. Provision has also been made whereby the casing of the telescope may be adapted for firm engagement by a support so that vibrations in the latter will not take place.

In the present embodiment of the invention herein illustrated the instrument is provided with an objective A, a collective B for the objective, an erecting system C, cross hairs or sighting mark D, and an eyepiece E. In order that the objective end of the instrument may lie out of alinement with the eyepiece end the casing of the telescope is formed of a plurality of arms at the junction of which are arranged prismatic reflectors F and G. In this instance the member of the casing of the telescope carrying the objective comprises a hood 1 preferably having threaded engagement with the prism carrying elbow 2 to which is connected a tubular section 3, the connection being established by a collar 4 screw threaded on the section 3 and having a flange 5 connected to a flange 6 on the elbow 2 by bolts 7. At the other end of the section 3 may be arranged a prism carrying elbow 8, the connection between these two parts being preferably established by a ring 9 connected to a flange 10 on the elbow 8 by screw bolts 11. To the other end of elbow 8 is connected a section 16, the latter preferably being provided with a ring 17 screw threaded on the end thereof and held to a flange 18 on the elbow 8 by screw bolts 19. The section 16 receives telescopically the casing member carrying the eyepiece, as will be hereinafter described.

The objective A and the collective B are preferably carried by a tube 20, the collective being adjustable relatively to the objective on screw threads 21. The tube may be held against movement within the casing and for this purpose is provided with a screw threaded portion to engage a like portion 22 on the inner end of the elbow 2, thus permitting it to be reached by disconnecting the elbow 2 from section 3.

The prismatic reflectors F and G in this instance have the same mounting, the elbows 2 and 8 each being provided with rigid stops or abutments 23 arranged at right angles to each other in pairs on opposite sides of the passageways through the elbow and in an enlarged chamber at the junction of its passageways. Said chamber has opposite side walls closed by plates 24 which engage opposite sides of a reflector and are secured in position by screws 25 permitting the prism to be removed. To the end that the prism may be firmly held against its shoulders or abutments 23, the wall 26, which is rigid or integral with the elbow, is provided on its inner face with a groove 27 receiving a presser bar 28 having spaced prism engaging portions 29 at opposite ends. The presser bar ends 29 are forced against the prism by a follower 30 arranged within an opening 31 in the wall 26 and held in said position and against said presser bar 28 by a plate 32 closing the opening and secured to the wall 26 by screws 33 which determine the pressure on the bar 28.

In order that the objective casing member may be firmly and snugly supported within two sleeves 69 arranged at right angles to each other on a bracket 68ª which is secured to the gun frame or carriage, two arms of the casings are adjustable laterally, relatively to each other and to this end there is interposed between the elbow 3 and the section 3 a laterally shiftable ring 12. This ring preferably has a curved or convex face 13, the center of said curve preferably being at the point of reflection 14 of the optical axis of the instrument by the reflector G. The proximate end of the section 3 or the ring 9 is concaved to conform to the face 13 so that when the ring 12 is shifted laterally the section 3 will swing laterally. Preferably the ring is held in position by providing the same with enlarged openings 15 through which the screw bolts 11 pass. With this arrangement the two arms of the objective casing member may be shifted relatively so that they may be fitted in their respective tubes without straining the joint between them. The casing member may be held firmly within the sleeve by jam nuts 70 threaded on sections 3 and 16 and coöperating with opposite ends of the sleeves 69.

Telescoping within the section 16 of the objective casing member is a tube 34 which may carry at its inner end the erecting system C and at its outer end may be provided with a flanged collar or ring 41, the periphery of the flange being provided with screw threads which are engaged by an enlarged or flared portion 42 on a tube 43, the latter having the eyepiece tube 44 engaged therewith and supporting the illuminating device 45 for the cross hairs D.

It is, of course, desirable that the focal adjustment may not be affected accidentally and to this end the section 16 is provided at one end with a ring 35 having screw threaded engagement with the exterior of the section 16 and projecting beyond the latter, the projecting portion being separated from the screw threaded portion by cuts 36 extending nearly entirely around the ring 35 to provide two spring or resilient clamping members or jaws 37 adapted to frictionally engage the exterior of the tube 34, a thumb screw 38 being provided for connecting the free ends of the jaws 37 and moving them toward and from the tube 34. The casing members may be held against relative rotation by a feather 39 secured to the tube 34 and operating in a groove 40 formed in the ring 35.

The cross hairs or sighting mark is preferably arranged between two plates of glass 46 supported by a carrier 47 which is rotatably mounted on a ring carrier 48 for the purpose of swinging the cross hairs in their plane so that the position of the sighting mark may be changed when the instrument is shifted.

The carrier 48 may be adjustable on guides 49 transverse to the optical axis of the instrument, and said guides 49 are preferably formed on a ring or carrier 50 which is adjustable on guides 51 transverse to the optical axis of the instrument and at an angle to the guides 49. These two carriers permit the center of the sighting mark to be alined with the optical axis of the instrument. Preferably the guides 51 are provided on the ring 52 which is fitted within the enlargement 42 between the tubes 34 and 43 and may be held therein by screws 53 passed through the front wall of the enlarged portion 42, through both carriers 48 and 50 and engaging the ring 52. These screws may be adjusted so that the ring carriers 48 and 50 may be firmly clamped within the enlarged portion 42. In order to effect the adjustment of the ring carriers 48 and 50, the enlarged portion 42 may be provided with radially adjustable devices or screws 54 and 54ª operable from the exterior of the enlarged portion and coöperating with opposite points on the peripheries of the ring carriers 48 and 50. Malicious or accidental operation of these adjusting screws 54 and 54ª and also screws 53 may be prevented by surrounding the enlarged portion 42 by a casing 55 provided with openings 56 and 68. This casing may be rotated on screw threads 57 to carry the openings 56 over the screws 54 and 54ª and openings 68 over screws 53, or may be shifted to throw said openings away from the screws so that the latter cannot be operated. The casing 56 may be held against movement by a lock screw 55ª working in the slot 58 in the casing and engaging the enlarged flange 42 of the enlargement of the tube.

To the end that the cross hairs may be rotated the tube 43 is surrounded by a ring or box 59 which is connected with the carrier 47 by means of a projection 60 extending outwardly from the carrier 47 through a circumferential slot 61 in the tube 43. Preferably the ring 59 has a longitudinal groove 62 into which the projection 60 extends, the groove permitting the withdrawal of the ring from the eyepiece end of the instrument. The ring is held against rotation and withdrawal by a screw 63 engaging the tube 43 and extending through a slot 64 in the ring 59, the head 65 of the screw operating in an annular depression or groove 66 and locking the ring against movement. The periphery of the ring 59 may also be provided with transverse grooves 67 adapted to be alined with the openings 68 in the casing 55 so that the screws 53 may be adjusted.

The operation of the instrument will be apparent to those familiar with these devices, but it may be stated generally that the bracket 68ª is secured to either side of the gun at an angle of about 45°, the cross hairs being shifted to correspond to the adjustment and being axially alined with the optical axis of the instrument. The eyepiece is adjusted to correspond to the eyes of the user by operating clamping jaws 37 to free and then to grip the tube 34. It is apparent that all the optical parts are rigidly secured against accidental adjustment due to the firing of the gun. The rotation of the cross hairs permits the instrument to be arranged on either side of the gun and in any operative position; and the relative lateral adjustment between the arms of the telescope prevents straining of the joint between the arms.

We claim as our invention:

1. A telescope having two connected angularly disposed tubular arms, coöperating objective and eye piece lenses and a prism fitted in said tubes, and a joint in one of said tubes permitting its relative angular adjustment to the other tube.

2. A mounting for telescopes comprising two angularly disposed tubes connected together, one of said tubes having a joint arranged in proximity to the other tube dividing said tube into two portions and permitting the angular adjustment of one portion relatively to the other tube and means for rigidly clamping the two portions of said tube in adjusted position.

3. A telescope having an eye piece, an objective arranged with its axis intersecting that of the eye piece and a prism located between said parts, connected tubular arms supporting the eye piece and objective, one of said arms being composed of two sections, a member forming an adjustable seat between said sections and permitting one section to be adjusted at an angle to the other, and clamping devices coöperating with the two sections for rigidly uniting them.

4. A telescope having its casing embodying two portions and a laterally shiftable ring between said portions, one face of the ring and one face of one of the portions being so formed that when the ring is shifted laterally the said portion swings laterally.

5. A telescope having its casing embodying two portions one of which has a concaved end, and a laterally shiftable ring interposed between said members having a convexed end coöperating with the concaved end of said tube portion.

6. A telescope having its casing embodying an elbow section containing a reflector, a laterally shiftable ring provided with a convex end struck on an arc whose center is located at the point of reflection of the optical axis of the instrument by the reflector, and a section coöperating with the convex end of the ring and adapted to swing laterally when the ring is shifted.

7. A telescope having its casing embodying two sections, independently operable adjusting devices securing said sections together, and a device interposed between said sections for effecting the lateral shifting of one of the sections.

8. A telescope having its casing embodying two sections one of which has a concaved end, independently operable adjusting screws connecting the sections, and a laterally shiftable ring interposed between the sections having a convex end coöperating with the concave end and provided with openings through which the adjusting screws pass.

9. A telescope comprising a casing member carrying the objective, a casing member carrying the eyepiece and telescoping with the objective carrying member, and a ring member having screw threaded engagement with one of said members and carrying a pair of clamping members for frictionally engaging the other member.

10. A telescope comprising a casing member carrying the objective, a casing member carrying the eyepiece and telescoping with the objective carrying member, and a ring member having screw threaded engagement with an end on one of said members, and having a pair of clamping members arranged beyond said end and engaging the other member.

11. The combination with a telescope having a barrel provided with a slot, an internal bearing in the barrel, and cross hairs, of a support for the latter journaled in the bearing and a projection on the support extending outwardly through the slot and adapted to adjust the support to shift the position of the cross hairs.

12. A sighting telescope having a cross hair carrier rotatably mounted therein, and a ring adjustably mounted on the exterior of the telescope and connected to the carrier and means for locking said ring to the telescope.

13. In a sighting telescope, the combination with a casing having a slot therein, of a cross hair carrier rotatably arranged within the casing, a ring mounted to turn on the exterior of the casing and connection between the ring and the carrier extending through the slot.

14. A sighting telescope comprising a casing having a slot therein, a cross hair carrier rotatably mounted within the casing, a projection extending from the carrier through the slot, and a rotatable ring surrounding the casing and having a longitudinally extending groove receiving the projection.

15. A sighting telescope comprising a casing, a cross hair carrier rotatably arranged in the casing, a ring mounted to turn on the exterior of the casing and having connection with the carrier, said ring being provided with a slot, and a locking screw arranged in the slot and engaging the casing to provide a stop for preventing the rotation of the carrier.

16. In a sighting telescope, the combination with a casing comprising an elbow and a tubular section secured to the elbow, of a prism arranged in the elbow, a tube fitted within the section having screw threaded engagement with the inner wall of the elbow, and an objective and a collective carried by the tube.

17. In a telescope, the combination with a casing embodying a chambered elbow having annular openings, abutments of less width than the diameters of said openings arranged at opposite sides thereof, of a prism arranged in the elbow having three faces, two of which coöperate with said abutments and means engaging the third face of the prism and holding it in position.

18. In a mounting for triangular prisms of telescopes, the combination with a casing having two openings disposed at right angles to each other, abutments centrally arranged at each side of the openings against which the edges of the right angle faces of the prism engage and a pressure member adapted to engage the edges of the third face of the prism.

19. In a telescope, the combination of an open ended elbow provided with an enlarged chamber opening on opposite sides, angularly arranged abutments in said chamber disposed centrally of the openings at the ends of the elbow, and closures for the openings at the sides of the elbow, with a prism engaged on opposite sides by the closures, and a device for pressing the prism into engagement with the abutments.

20. The combination with a casing having a pair of angularly arranged abutments therein and a grooved wall provided with an opening, of a prism arranged within the casing and coöperating with the abutments, and a pressure means for holding the prism against the abutments comprising a member arranged within the groove and having spaced engaging portions coöperating with the prism, a follower arranged within the opening with the said member, a plate holding the follower within the opening and arranged on the exterior of the casing to cover said opening, and screw means for holding the plate to the casing.

21. In a sighting telescope, the combination with a casing, of a pair of ring members arranged therein, one of which is adjustable transversely of the optical axis of the instrument and the other of which is adjustable and guided on the first named member to move transverse to the optical axis of the instrument and at an angle to the line of adjustment of the first named member, and a sighting mark carried by the second named member.

22. In a sighting telescope, the combination with a casing, of a pair of ring members arranged therein, one of which is adjustable transversely of the optical axis of the instrument and the other of which is adjustable on the first named member transverse to the optical axis of the instrument and at an angle to the line of adjustment of the first named member, a rotatable member on the second named member, and a sighting mark on the rotatable member.

23. In a sighting telescope, the combination with a casing, of a ring member therein having a guide transverse to the optical axis of the instrument, a ring member movable on said guide and having a guide transverse to the optical axis and at an angle to the first named guide, a ring member movable on the second named guide, and a sighting mark carried by said ring member.

24. In a sighting telescope, the combination with a casing, of a ring member arranged within the casing and adjustable transversely of the optical axis of the instrument, a ring member adjustable on the first named member transverse to the optical axis of the instrument and at an angle to the line of adjustment of the said first named member, adjusting screws on the casing to effect the adjustments of the ring members, and a sighting mark carried by the second named ring member.

25. In a sighting telescope, the combination with a casing, of a ring member arranged within the casing and adjustable transversely of the optical axis of the instrument, a ring member adjustable on the first named member transverse to the optical axis of the instrument and at an angle to the line of adjustment of the said first named member, adjusting screws on the casing to effect the adjustments of the ring members, a sighting mark carried by the second named ring member, and a rotatable member surrounding the casing and having openings adapted to be alined with the adjusting screws to permit the latter to be operated.

26. In a telescope, the combination with an objective carrying casing member, of an eyepiece-carrying casing member telescoping with the objective casing member and comprising a tube having a flange at one end, a tubular member having an enlarged portion secured to the flange, a ring member fitted to the enlarged portion and provided with a guide extending transversely of the optical axis of the instrument, a ring member movable on said guide and having a guide transverse to the optical axis and at an angle to the first named guide, a ring member movable on the second named guide, a sighting mark carried by the last named ring member, adjusting devices carried by the enlarged portion for coöperating with the adjustable ring members, and means for holding the first named ring member to the enlarged portion.

GEORGE N. SAEGMULLER.
ALBERT GREBE.

Witnesses:
HENRY C. THON,
EDWARD W. HOWE.